(12) United States Patent
Häfner et al.

(10) Patent No.: US 7,226,248 B2
(45) Date of Patent: Jun. 5, 2007

(54) DEVICE FOR THE CONTINUOUS GRAVIMETRIC METERING AND PNEUMATIC CONVEYING OF POURABLE MATERIAL

(75) Inventors: Hans Wilhelm Häfner, Aichach-Walchshofen (DE); Hubert Wolfschaffner, Dasing (DE)

(73) Assignee: pfister GmbH, Augsburg (DE)

( * ) Notice: Subject to any disclaimer, the term of this patent is extended or adjusted under 35 U.S.C. 154(b) by 0 days.

(21) Appl. No.: 10/502,498

(22) PCT Filed: Jan. 24, 2003

(86) PCT No.: PCT/EP03/00734

§ 371 (c)(1), (2), (4) Date: Jul. 27, 2005

(87) PCT Pub. No.: WO03/062763

PCT Pub. Date: Jul. 31, 2003

(65) Prior Publication Data

US 2006/0008330 A1   Jan. 12, 2006

(30) Foreign Application Priority Data

Jan. 24, 2002   (DE) .................. 202 01 092 U

(51) Int. Cl.
*B65G 53/12*   (2006.01)
(52) U.S. Cl. .................. 406/146; 406/144; 406/66; 406/67; 222/636
(58) Field of Classification Search .............. 406/64, 406/65, 66, 67, 144, 146; 222/636
See application file for complete search history.

(56) References Cited

U.S. PATENT DOCUMENTS

| 2,285,216 | A | * | 6/1942 | Lundgren ..................... 406/67 |
| 4,154,486 | A |   | 5/1979 | Nishikawa |
| 4,435,122 | A | * | 3/1984 | Niskanen et al. ........ 415/121.3 |
| 4,528,848 | A | * | 7/1985 | Hafner ......................... 73/218 |
| 4,569,161 | A | * | 2/1986 | Shipman ....................... 451/99 |
| 4,646,943 | A | * | 3/1987 | Hafner ........................ 222/148 |
| 4,661,024 | A | * | 4/1987 | Hafner ......................... 406/63 |
| 4,682,915 | A |   | 7/1987 | Haefner |
| 5,255,830 | A |   | 10/1993 | Haefner |
| 5,379,706 | A | * | 1/1995 | Gage et al. ................. 111/175 |
| 5,769,571 | A | * | 6/1998 | Higuchi ...................... 406/137 |
| 5,997,220 | A | * | 12/1999 | Wormser ...................... 406/66 |
| 6,019,180 | A | * | 2/2000 | Pafitis et al. .................. 175/38 |

* cited by examiner

FOREIGN PATENT DOCUMENTS

EP   0 588 297 A   3/1994

*Primary Examiner*—Joe Dillon, Jr.
(74) *Attorney, Agent, or Firm*—Knobbe Martens Olson & Bear LLP

(57) ABSTRACT

Disclosed is a device for the continuous gravimetric metering and pneumatic conveying of pourable material which is conveyed across a given distance by a metering rotor (1) which is arranged in a pressure-proof manner in a housing (2) and is provided with conveying pockets (1*a*). Said housing (2) comprises a charging station and a discharging station for the pourable material, which are connected to the inlet/outlet (4, 5) of a pneumatic conveyor system. The housing (2) is connected to a force metering device which detects the momentary load generated on the metering rotor (1) by the conveyed material. The inlet and outlet of the pneumatic conveyor system are connected to the bottom of the housing (2). In order to build the inventive device in a compact manner while reducing the assembly requirements and improving flow guidance, the flow from the inlet (4) to the outlet (5) is deflected within the upper area of the housing (2).

10 Claims, 2 Drawing Sheets

DEVICE FOR THE CONTINUOUS GRAVIMETRIC METERING AND PNEUMATIC CONVEYING OF POURABLE MATERIAL

The present invention relates to a device for continuous gravimetric metering and pneumatic conveying of pourable material, which is conducted over a measuring length using a metering rotor positioned pressure-tight in a housing and provided with conveyor pockets, the housing having a pourable material delivery station and an emptying station having connections to lines of a pneumatic conveyor system and being connected to a force measurement device, via which the torque load exerted on the metering rotor by the material conveyed is determined.

A device of this type is known as a metering rotor scale from U.S. Pat. No. 4,682,915 of the present applicant. In this case, a pneumatic conveyor system is provided for "blowing out" the conveyor pockets of the metering rotor, the feed line being guided from below to the metering rotor in order to blow out the pourable material upward from the conveyor pockets to the removal line and convey it further. This device has proven itself in principle. Since the compensators in the feed and removal lines and in the pourable material delivery station, which are necessary for decoupling, are positioned on a line with the pivot axis of the metering rotor, construction problems may occur, however, in order to house these compensators above the metering rotor. The pourable material funnel on the delivery station is thus generally offset upward in order to guide the removal line of the pneumatic conveyor system further upward without a large deflection. In addition, a minimum air velocity must be maintained to blow through from bottom to top, in order to ensure the required discharge under all conditions. However, in the event of low conveyance quantities, this may lead to disproportionate quantities of air of the pneumatic conveyor system.

The present invention is thus based on the object of improving a device according to the features according to the preamble in regard to construction and installation complexity and flow guiding.

This object is achieved by a device according to the features of Claim 1. Preferred embodiments are the object of the subclaims.

Through the flow reversal of the pneumatic conveyor system within the housing, the line arrangement of the pneumatic conveyor system may be simplified and designed compactly. Thus, the two compensators of the feed line and the removal line may be positioned outside the support frame of the metering rotor scale, so that the tight construction space above the metering rotor may be used better, for example, by a pourable material funnel which is placed lower or a smaller overall height of the support frame. In addition, the installation and possible necessary maintenance or checking of the pneumatic conveyor system is made easier in this way through the better accessibility to the components. The improved flow guiding in the conveyor pockets of the metering rotor is especially advantageous in this case, since the feed air guiding within the housing is reversed in its upper region directly above the metering rotor and is directed from above through the conveyor pockets, so that the discharge of the pourable product is also supported through gravity. In addition, improved discharge out of the conveyor pockets and transfer into the removal line results, particularly for small conveyed quantities, through the eddying during the air reversal. Furthermore, the energy required for the pneumatic conveyor system is reduced, since smaller quantities of air and/or lower air velocities of the conveying air are to be provided. Furthermore, the installation complexity is reduced since the flow reversal elements are integrated in the housing and no longer need to be mounted and/or sealed separately.

In the following, an exemplary embodiment of the device will be described in greater detail on the basis of the drawing.

Figure 1:
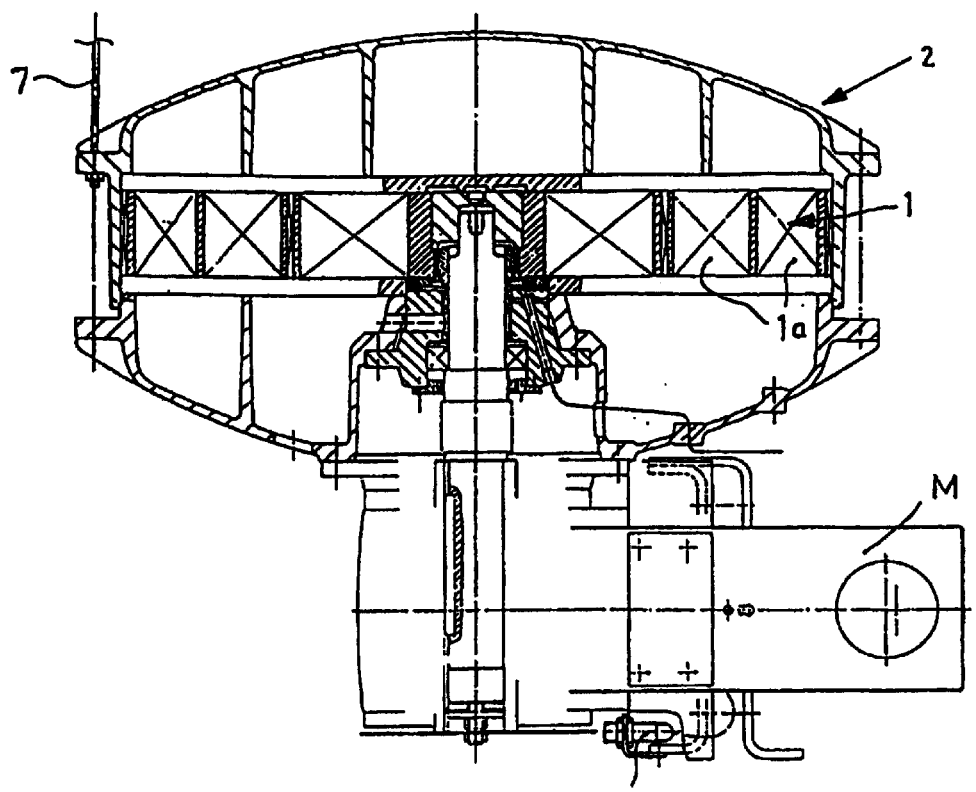
FIG. 1 shows a schematic cross-section of a metering rotor scale for basic explanation of the construction principle.
Figure 2:
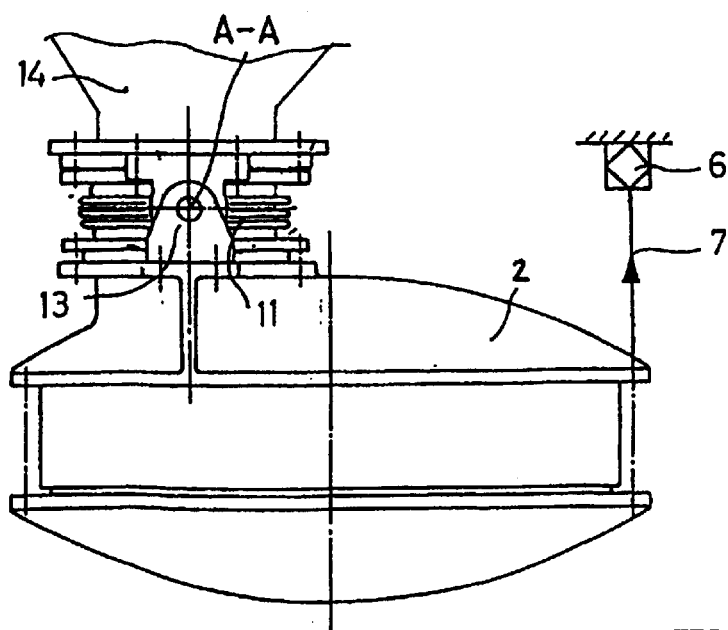
FIG. 2 shows a side view of a metering rotor scale according to the related art.

A metering rotor scale is shown in cross-section in FIG. 1. This essentially includes a housing 2 having a metering rotor 1, which has multiple conveyor pockets 1*a*, rotating between sealing plates therein. The metering rotor 1 is driven by a controllable motor M. The conveyor pockets 1*a* are positioned in the form of concentric rings in the metering rotor 1. In addition, openings (8; cf. FIG. 3) are provided radially on the inside, which are used in the related art to generate blocking air. A pneumatic conveyor system having feed and removal lines is connected to housing 2, in order to thus form an emptying station. Furthermore, a pourable material delivery station 14 (cf. FIG. 2) is implemented above the housing 2, the housing 2 being mounted so it is pivotable around a horizontal axis, in order to act on a force measurement cell 6 via a suspension 7 at a distance therefrom (cf. FIG. 2). Because of the pivoting around the pivot axis A—A, shown in FIG. 2 and formed by bearing 13 (cf. also FIG. 3), the torque load which is exerted by the material conveyed on the metering rotor 1 as the measuring length is thus detected. Compensators, which are positioned together with the compensator 11 at the pourable material delivery station on the pivot axis A—A, are provided for decoupling force influences.

Figure 3:
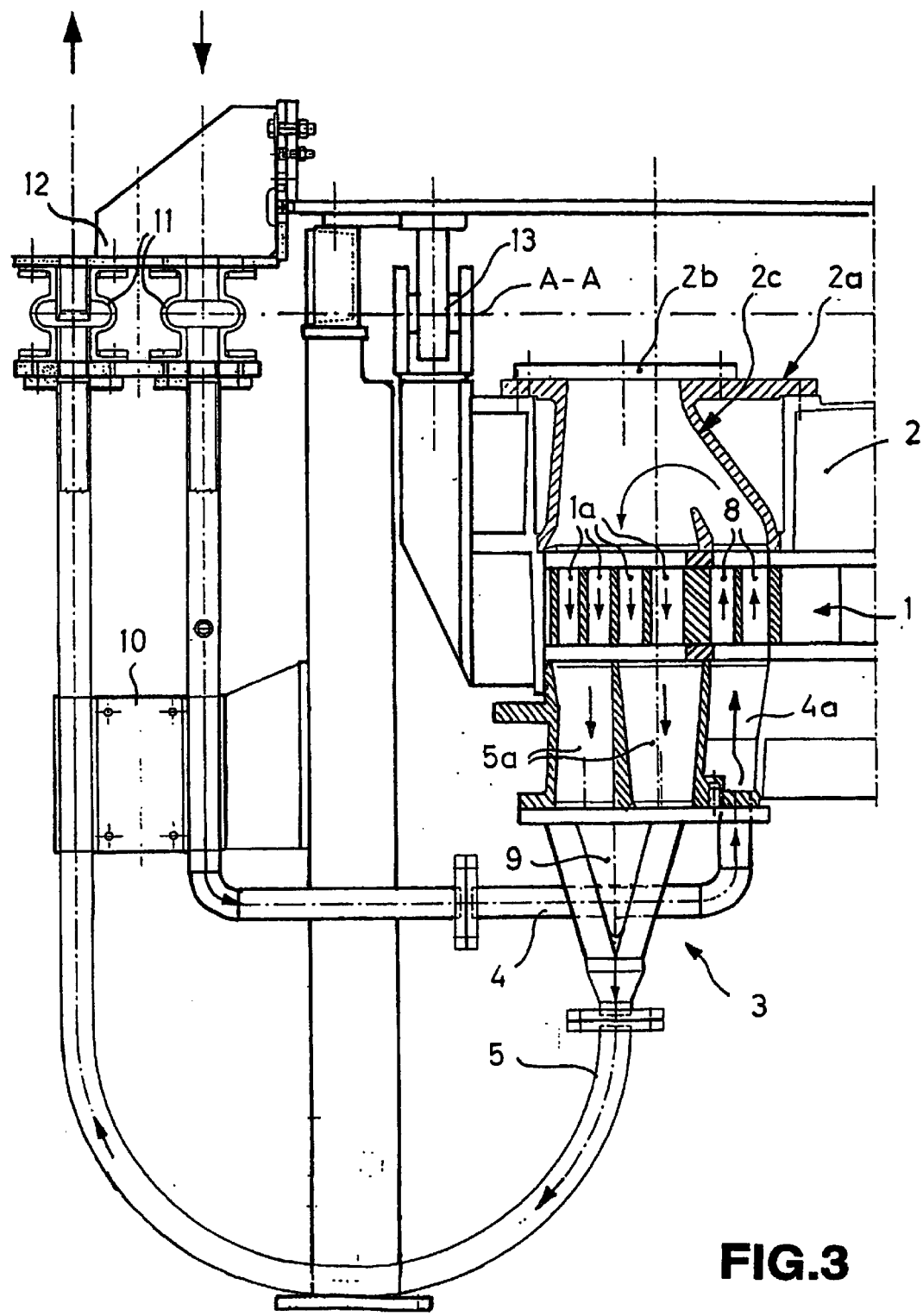
FIG. 3 shows an enlarged illustration of one-half of the metering rotor scale having the design of the arrangement of the lines according to the present invention.

The suggested guiding of the pneumatic conveyor system 3 according to the present invention is shown in FIG. 3. In this case, both connections 4*a*, 5*a* of the feed line 4 and the removal line 5, respectively, of the pneumatic conveyor system 3 are connected to the bottom of the housing 2. The feed line 4 leads to radially internal openings 8 in the metering rotor 1 in this case, in order to be guided directly over them within the housing 2 in a deflection curve 2*c* back downward to the conveyor pockets. The top 2*a* of the housing 2 is sealed by a simple sealing plate 2*b*, in contrast to the earlier construction.

Through this flow deflection and/or reversal within the housing 2, the discharge out of the conveyor pockets 1*a* is significantly improved, since even at low air velocities, vortexes arise which make the discharge of the pourable material out of the conveyor pockets 1*a* easier and, in particular, gravity also acts on the pourable material located in the conveyor pockets 1*a*. Therefore, the discharge may be performed reliably via the collection funnel 9 located underneath and the removal line 5. The connection 5*a* is implemented as a double connecting piece in this case and is used, like the collecting funnel 9, for continuous transfer of the sector cross-section of the conveyor pockets 1*a* to the tubular cross-section of the removal line 5.

The removal line 5 and the feed line 4 of the pneumatic conveyor system 3 are preferably connected laterally to one another in this case via a clamp 10 on the support stand, so that the installation complexity is reduced. This is correspondingly true for the attachment of the compensators 11 of the feed line 4 and the removal line 5 on a shared bracket 12, so that the mounting complexity for the required compensators 11 is also reduced here, since they may form one installation unit. Therefore, the maintenance outlay possibly required in long-term use is reduced, since the compensators 11 are positioned so they are easily accessible.

The invention claimed is:

1. A device for continuous gravimetric metering and pneumatic conveying of pourable material, which is guided using a metering rotor, positioned pressure-tight in an enclosed housing and provided with conveyor pockets, over a measuring length, the housing having a pourable material delivery station and an emptying station having respective connections to feed/removal lines of a pneumatic conveyor system and being connected to a force measurement device, via which the torque load exerted on the metering rotor by the material conveyed may be determined, and the feed line and removal line of the pneumatic conveyor system being connected to the bottom of the housing,
   wherein a flow deflector from the feed line to the removal line is positioned inside the upper region of the housing.

2. The device according to claim 1, wherein the feed line of the pneumatic conveyor system is connected to radially internal openings in the metering rotor.

3. The device according to claim 2, wherein the openings are implemented in the form of shafts, which are positioned concentrically to one another.

4. The device according to claim 1, wherein the housing is closed on top by a sealing plate.

5. The device according to claim 1, wherein the flow deflection inside the housing is implemented at the emptying station in the form of a deflection curve.

6. The device according to claim 1, wherein the conveyor pockets of the metering rotor are positioned concentrically to one another.

7. The device according to claim 6, wherein a collection funnel, for transferring the cross-section of the conveyor pockets to the tubular cross-section of the removal line, is implemented on the bottom of the housing.

8. The device according to claim 1, wherein the connection of the removal line is implemented as a double connecting piece.

9. The device according to claim 1, wherein the feed line and the removal line are connected to one another laterally from the housing by a clamp.

10. The device according to claim 1, wherein compensators of the feed line and the removal line are attached to a shared bracket laterally from the housing.

* * * * *